United States Patent [19]

Mantoan et al.

[11] Patent Number: 5,480,194
[45] Date of Patent: Jan. 2, 1996

[54] METAL EXPANSION JOINT VIBRATION ABSORBER APPARATUS FOR PIPE SYSTEMS

[75] Inventors: Silvano Mantoan, Au; Werner Petermann, Emmenbrücke, both of Switzerland

[73] Assignee: BOA AG, Rothenburg, Switzerland

[21] Appl. No.: 342,835

[22] Filed: Nov. 21, 1994

[51] Int. Cl.⁶ ................................................ F16L 11/12
[52] U.S. Cl. ........................... 285/49; 285/226; 285/286; 285/300; 285/906
[58] Field of Search ........................... 285/49, 299, 300, 285/301, 226, 227, 228, 229, 286, 906

[56] References Cited

U.S. PATENT DOCUMENTS

| | | | |
|---|---|---|---|
| 1,565,254 | 12/1925 | Bystrom | 285/226 X |
| 2,337,038 | 12/1943 | Fentress | 285/300 X |
| 2,712,456 | 7/1955 | McCreery | 285/226 X |
| 2,840,394 | 6/1958 | Rohr | 285/300 |
| 3,298,680 | 1/1967 | Jablin | 285/300 X |
| 3,492,030 | 1/1970 | Harrison et al. | 285/300 |

*Primary Examiner*—Dave W. Arola
*Attorney, Agent, or Firm*—Marshall, O'Toole, Gerstein, Murray & Borun

[57] ABSTRACT

The apparatus consists of three single integral sheet metal structures interconnected by weldings. The first structure is the bellows element. The second structure is an integral formed sheet metal part which forms the one flange element and simultaneously the protection sleeve element. The third structure is a further integral formed sheet metal part which forms the other flange element and simultaneously the pipe stub element in which the free end of the protection sleeve element is received. The flange elements are formed in that the sheet metal parts include a first and a second portion, whereby the respective second portions are folded back over the respective first portions and welded thereto.

3 Claims, 2 Drawing Sheets

METAL EXPANSION JOINT VIBRATION ABSORBER APPARATUS FOR PIPE SYSTEMS

BACKGROUND OF THE INVENTION

1. Field of the Invention

The present invention relates to a metal expansion joint and vibration absorber apparatus for pipe systems having at least one metal bellows element, at least one flange element adapted to be mounted to a respective adjacent structure, and having at least one protection sleeve element in form of a pipe stub located inside of and extending coaxially to the metal bellows element.

Metal expansion joints and vibration absorber apparatuses in pipe systems are predominantly used in two applications. A first application is the use of such apparatuses as expansion joint and a second application is the use as vibration absorber. In both applications the basically same design of the apparatus is used, whereby in case of expansion joints the primary operation of the apparatus is taking up displacements of pipes in a pipe system whereby such apparatus absorbs due to its design comprising a metal bellows element as secondary effect also possible vibrations in the pipe system. In case of vibration absorption the primary operation of the apparatus is absorbing vibrations in a pipe system whereby such apparatus takes up displacements of pipes in the pipe system as secondary effect. Also possible are applications in which the apparatus is used to take up displacements and simultaneously to absorb vibrations. The basic operating member of these apparatuses is its metal bellows which is calculated and designed regarding material, dimensions, etc. depending from the prevailing object, namely to absorb pipe displacements or then to absorb vibrations.

When such apparatus is used as pipe displacement absorbing apparatus it is called expansion joint.

Expansion joints are commonly used in pipe lines, pipe line systems and circuits in which for instance due to high or low temperature of the commodity flowing through the pipes the temperature of the pipes themselves increases or decreases accordingly leading to thermal expansions or contractions, resp. These expansions or contractions, resp. cause generally changes of the axial dimension of the pipes and also angular movements and lateral shifting displacements. In order to take such displacements up expansion joints are inserted between the pipe sections, whereby the metal bellows of these joints contract and expand such to take up mentioned changes of the dimensions.

The object of vibration absorbers is the absorption of vibrations in pipe systems in that the metal bellows absorbs vibrations or oscillations, resp. caused by the commodity flowing in the pipe system (turbulence), or vibrations stemming from a machine to which pipes are coupled, e.g. compressors or internal combustion machines, whereby in latter case the exhaust pipe or manifold is coupled via such a vibration absorber to the machine.

2. Description of the Prior Art

Metal expansion Joint and vibration absorbing apparatuses have commonly included a single or multiply bellows element made of a thin sheet of metal and formed with convolutions, which sheet metal bellows element is mounted e.g. by welding, soldering or clamping at both its end to respective flange elements via which the expansion joint or vibration absorber, resp. is coupled at both its ends e.g. via bolts or clamps to an adjacent pipe section of a pipe system or machine, resp. In order to protect the bellows from the commodity or fluid, resp. flowing through the apparatus and also to avoid turbulences in the fluid a protection sleeve can be arranged inside the bellows which extends coaxially thereto. This protection sleeve is generally mounted in one or the other way to one of the flanges. It may have an upturned end sandwiched between the flange of the expansion joint or vibration absorber, resp. and the flange of an adjoining structure, e.g. pipe, or it could be welded to the flange of the expansion joint.

Thus, the known expansion joints or vibration absorbers, resp. are assembled of a plurality of parts of various structural and physical properties. Accordingly, a manufacturer must keep a rather large amount of different articles for assembling such apparatuses in stock, the assembling of the apparatuses is time consuming because a plurality of individual articles must be assembled and finally, specifically due to the solid flanges, the known expansion joints and vibration absorbers, resp. have a relatively considerable weight.

SUMMARY OF THE INVENTION

Therefore, it is a general object of the present invention to provide a metal expansion joint and vibration absorber apparatus for pipe systems consisting of a minimum of individual parts, in which a maximum of the parts are of an identical sheet material, which is of an extremely light weight and can be produced at low costs.

A further object is to provide a metal expansion joint and vibration absorber apparatus in which at least one flange element and at least one protection sleeve element are one single continuous integral sheet metal structure.

Yet a further object is to provide a metal expansion joint and vibration absorber apparatus in which the single continuous integral sheet metal structure includes a first portion continuous to the protection sleeve member and a second portion which is folded back onto the first portion forming a fold area between the first and the second portions, which fold area is shaped to provide the flange element.

Still a further object is to provide a metal expansion joint and vibration absorber apparatus having one flange element and one thereto continuous integral protection sleeve element; and having a mounting unit including a further flange element located axially opposite of the one single integral sheet metal structure and a pipe stub member located inside of and extending coaxially to the metal bellows element, whereby an end portion of the protection sleeve element is received in the pipe stub member, and in which the further flange element and the pipe stub member are a further single continuous integral sheet metal structure.

A further object is to provide a metal expansion joint and vibration absorber apparatus in which the bellows element has a first and a thereto opposite second end, which first end is welded to a first single continuous integral metal structure consisting of a first flange element and a protection sleeve pipe stub element, and which second end is welded to a further single continuous integral metal structure consisting of a second flange element and a pipe stub element, such that the apparatus consists of three formed sheet metal structures which are interconnected by welding.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
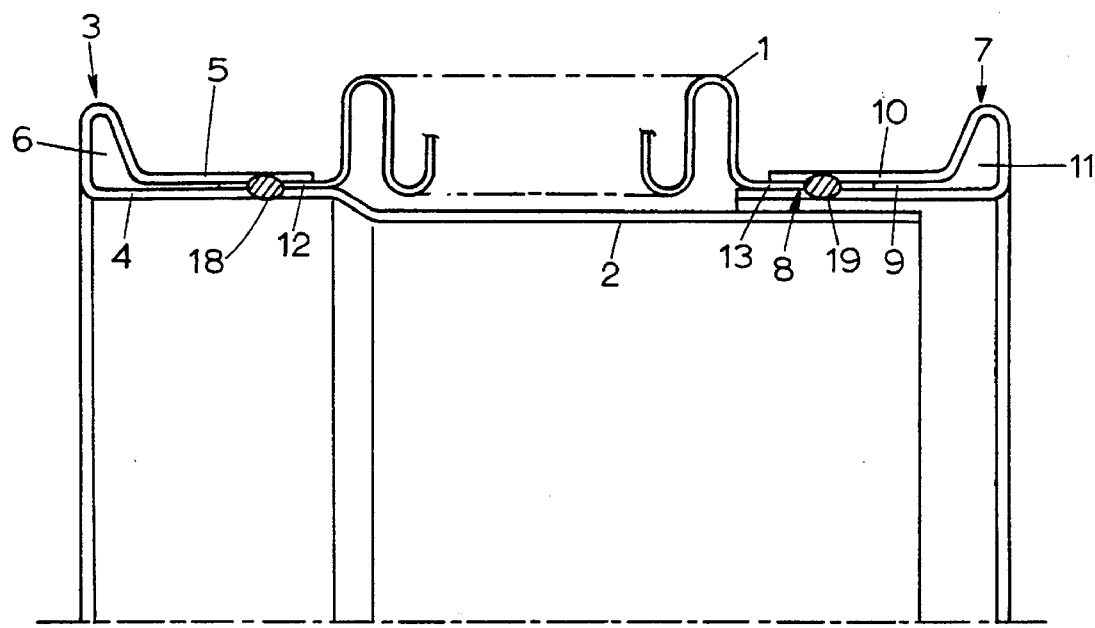
FIG. 1 is a schematic view of a longitudinal section through the upper half of a first preferred embodiment of the invention.

In the following detailed description same or corresponding resp. parts of the embodiment illustrated in the three drawings carry the same reference numerals.

The figures illustrate schematically schematic views of embodiments of the inventive expansion joint and vibration absorber apparatus.

The apparatus shown includes a metal bellows element 1 made of a thin flexible sheet metal which has been formed to have the illustrated convolutions. The metal selected can be any kind of metal having the prerequisite flexibility when deformed and possibly selected to withstand the pressure, temperature and also possible chemical attacks of the fluid it comes in contact with.

The bellows element 1 illustrated in the drawings is of a single-ply design. Obviously, this bellows element 1 could be of a multi-ply design as also commonly known in the prevailing art.

Inside the bellows element 1 and extending coaxially thereto is a protection sleeve element 2 which has been described further above. This protection sleeve element 2 consists of a sheet metal.

At the left side the apparatus includes a flange element 3 made of the same sheet metal as the protection sleeve element 2. This flange element 3 includes a first smooth portion 4 and a second smooth portion 5. The second portion 5 of the flange section 3 is folded back and over the first portion 4 and is welded thereto at the welding spot 18, extending obviously along the circumference of the apparatus. The fold area 6 between the first and second flange portions 4 and 5, resp. is shaped to form the left side flange of the expansion joint or vibration absorber, resp. The apparatus is coupled via this flange shaped fold area 6 to a (not illustrated) adjoining pipe. This coupling can be achieved by a variety of techniques. Here it shall be assumed that the coupling is made (according to a known technique) by a ring of a U-shaped cross-section which is clamped over this flange shaped fold area 6 and the flange of the adjoining pipe, such that the flange shaped fold area 6 and adjacent flange are inserted between the two legs of the U-shape.

The first and second portions 4 and 5 and the protective sleeve element 2 are made by a corresponding forming of one single sheet metal piece such that the flange element 3 and the protective sleeve element 2 are one single continuous integral sheet metal structure.

The structure at the right side of the apparatus, i.e. expansion joint or vibration absorber is commonly called its mounting unit. This mounting unit includes a further flange element 7. The further flange element 7 includes a pipe stub section 8. The protection sleeve element 2 projects at its free end into this pipe stub section 8 according to well known designs of expansion joints and vibration absorbers. The further flange element 7 includes a further smooth first portion 9 and a further smooth second portion 10. The further second portion 10 is folded back and over the further first portion 9 and is welded thereto at the welding spot 19. The now further fold area 11 between these portions 9 and 10 is shaped to form the right side flange of the apparatus. The coupling to an adjoining pipe (or any other structure, e.g. a compressor or internal combustion engine) is made such as set forth earlier in this description.

The further first and second portions 9 and 10 and the pipe stub section 8 are also made by a forming of one single sheet metal piece such that the flange element 7 and the pipe stub element 8 are also one single continuous integral sheet metal structure.

There are several designs regarding the bonding of the bellows element 1 to the two flange elements 3 and 7, of which three preferred embodiments are depicted in the three figures.

The bellows element 1 of the embodiment illustrated in FIG. 1 has a first neck 12 and a second opposite neck 13. The first neck 12 of the bellows element 1 is inserted in a sandwich like manner between the first portion 4 and the second portion 5 of the flange element 3 and is bonded to these portions 4 and 5 by the single welding spot 18. Likewise, the second neck 13 of the bellows element 1 is inserted in a sandwich like manner between the further first portion 9 and the further second portion 10 and is bonded to these portions 9 and 10 by the single welding spot 19.

Thus, the entire metal expansion joint consists of three distinct parts only which are welded together at totally only two weld spots. Obviously, these weld spots are annular weldings around the circumference of the respective parts made by any known welding technique including e.g. roll welding, resistance welding, etc.

Figure 2:
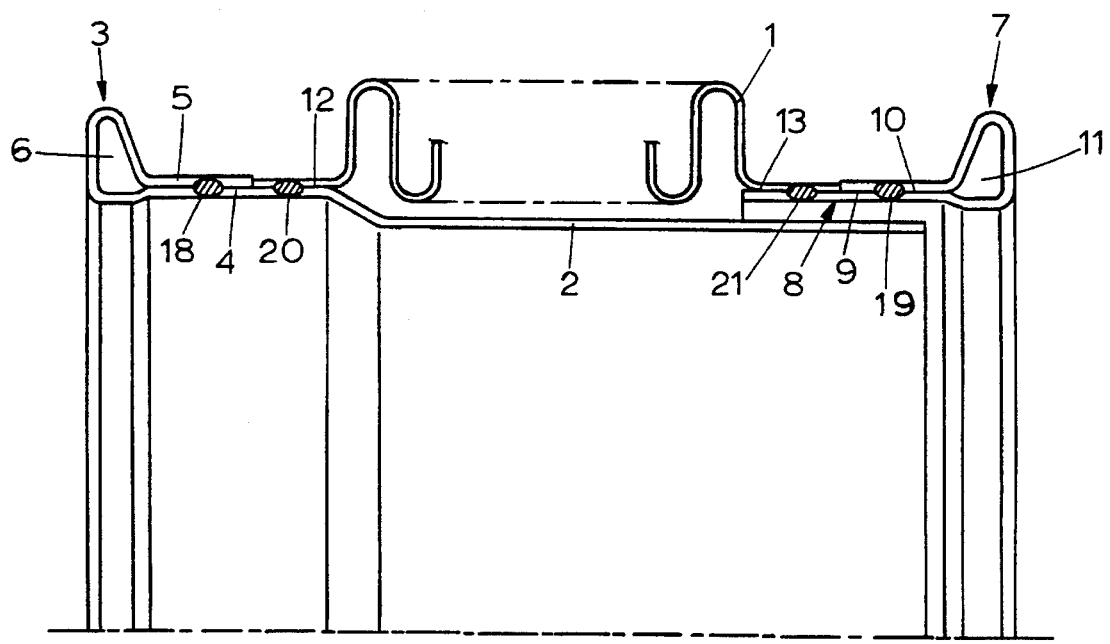
FIG. 2 is a schematic view of a longitudinal section through the upper half of a second preferred embodiment of the invention.

The bellows element 1 of the embodiment illustrated in FIG. 2 has also a first neck 12 and a second opposite neck 13. The neck 12 rests on the first portion 4 and abuts the second portion 5 of the flange element 3 and is welded only to the first portion, at the spot 20, and likewise the neck 13 is welded at the spot 21 to the further first portion 9 and abuts the further second portion 10 of the flange element 7. Accordingly, this embodiment includes four welding spots.

Figure 3:
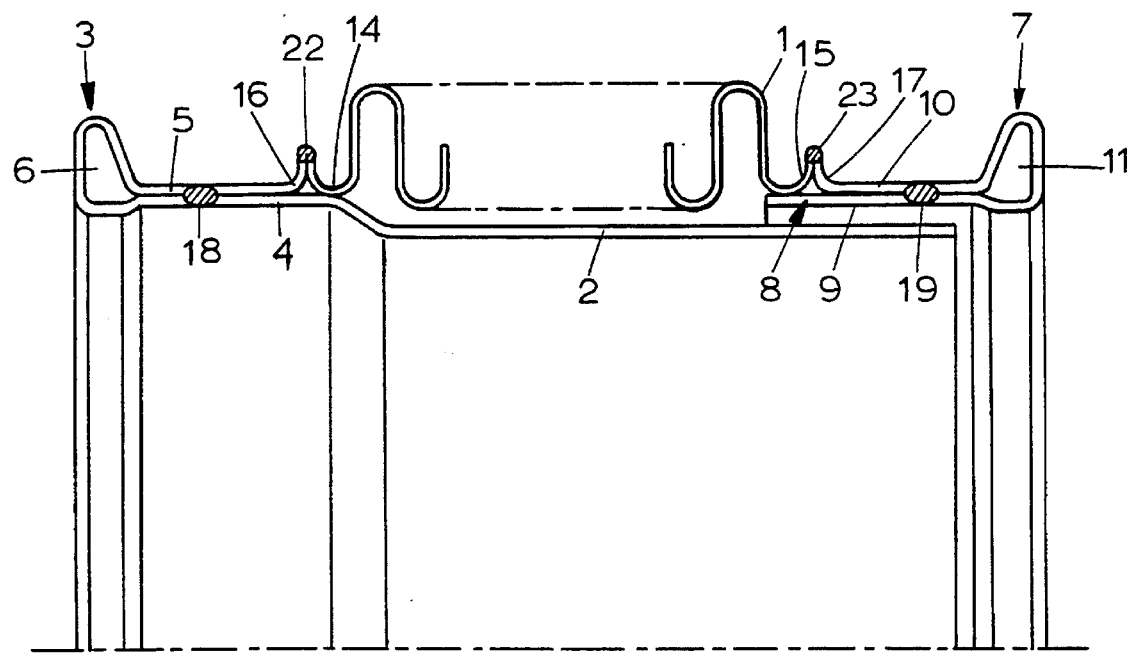
FIG. 3 is a schematic view of a longitudinal section through the upper half of a third preferred embodiment of the invention.

In the embodiment according to FIG. 3 the bellows element 1 has upturned ends 14 and 15. Correspondingly, the second portion 5 and 10 of the flange element 3 have also upturned ends 16 and 17. The upturned end 14 of the bellows element 1 is welded to the upturned end 16 of the second portion 5 at the welding spot 22 and the upturned end 15 of the bellows element 1 is welded to the upturned end 17 of the second portion of the flange element 3 at the welding spot 23.

Figure 4:
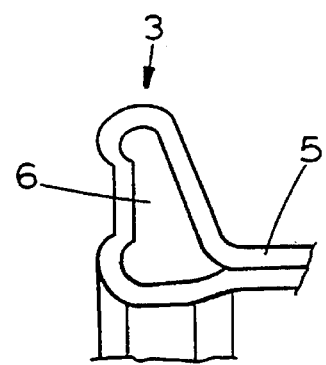
FIG. 4 is a schematic view on a somewhat enlarged scale of a modified design of a flange.

In the embodiments of FIGS. 1–3 the end surface of the flange element 3, i.e. the surface which is to contact the flange of the e.g. pipe to which the apparatus is to be mounted, is of a planar design. Embodiments are foreseen in which this surface is structured such as illustrated as example in FIG. 4. The surface of the flange has a recessed area for receiving e.g. a sealing ring. The shape of such recess can obviously be varied in accordance with the shape of the sealing ring to be received. A further possibility is also a structuring which acts as positioning guide for a mounting the respective adjacent structure such as annular ribs or similar projections.

Thus, it can be seen from the above detailed description of the embodiments that the metal expansion joint and vibration absorber apparatus consists of merely three individual parts which are interconnected by weldings. Therefore, the described apparatus is not only of an extreme light weight design but can also be produced at a low cost.

Will there are shown and described present preferred embodiments of the invention, it is to be distinctly understood that the invention is not limited thereto, but be otherwise variously embodied and practiced within the scope of the following claims.

We claim:

1. An expansion joint and vibration absorber apparatus having at least one metal bellows element, at least one flange element adapted to be mounted to a respective adjacent structure, and having at least one protection sleeve element in form of a pipe stub located inside of and extending coaxially to said bellows element;

in which said at least one flange element and said at least one protection sleeve element are one single continuous integral sheet metal structure which includes a first portion continuous to said protection sleeve element and a second portion which is folded back onto the first portion forming a fold area between the first and the second portions, which fold area is shaped to provide the flange element;

and having a mounting unit including a further flange element located axially opposite of said one single integral sheet metal structure and a pipe stub element located inside of and extending coaxially to said bellows element, whereby an end portion of said protection sleeve element is received in said pipe stub element;

in which said further flange element and said pipe stub element are a further single continuous integral sheet metal structure which includes a further first portion forming said pipe stub element and a further second portion which is folded back onto said further first portion forming a further fold area therebetween, which further fold area is shaped to provide said further flange element;

wherein said bellows element has a first and a thereto opposite second end, which first end is welded to the first named single continuous integral sheet metal structure and which second end is welded to the further single continuous integral sheet metal structure, such that the metal expansion joint consists of three formed metal structures which are interconnected by weldings; and in which said first and said second ends of the bellows element form its first and second necks, which first neck is inserted in a sandwich-like manner between the first portion and the second, folded back portion of said single continuous integral metal structure and is welded at one spot to both portions, and which second neck is inserted in a sandwich-like manner between the further first portion and the further second folded back portion of said further single continuous integral metal structure and is welded at one spot to both further portions.

2. An expansion joint and vibration absorber apparatus having at least one metal bellows element, at least one flange element adapted to be mounted to a respective adjacent structure, and having at least one protection sleeve element in form of a pipe stub located inside of and extending coaxially to said bellows element;

in which said at least one flange element and said at least one protection sleeve element are one single continuous integral sheet metal structure which includes a first portion continuous to said protection sleeve element and a second portion which is folded back onto the first portion forming a fold area between the first and the second portions, which fold area is shaped to provide the flange element;

and having a mounting unit including a further flange element located axially opposite of said one single integral sheet metal structure and a pipe stub element located inside of and extending coaxially to said bellows element, whereby an end portion of said protection sleeve element is received in said pipe stub element;

in which said further flange element and said pipe stub element are a further single continuous integral sheet metal structure which includes a further first portion forming said pipe stub element and a further second portion which is folded back onto said further first portion forming a further fold area therebetween, which further fold area is shaped to provide said further flange element;

wherein said bellows element has a first and a thereto opposite second end, which first end is welded to the first named single continuous integral sheet metal structure and which second end is welded to the further single continuous integral sheet metal structure, such that the metal expansion joint consists of three formed metal structures which are interconnected by weldings; and in which said first and said second ends of the bellows element form its first and second necks, and in which said folded back second portion is welded onto said first portion at a first spot and the first neck of the bellows element is located in a butt-joint manner adjacent the second portion and is welded onto the first portion at a second spot, further in which said further folded back second portion is welded onto said further first portion at a third spot and the second neck of the bellows element is located in a butt-joint manner adjacent the further second portion and is welded onto the further first portion at a fourth spot.

3. An expansion joint and vibration absorber apparatus having at least one metal bellows element, at least one flange element adapted to be mounted to a respective adjacent structure, and having at least one protection sleeve element in form of a pipe stub located inside of and extending coaxially to said bellows element;

in which said at least one flange element and said at least one protection sleeve element are one single continuous integral sheet metal structure which includes a first portion continuous to said protection sleeve element and a second portion which is folded back onto the first portion forming a fold area between the first and the second portions, which fold area is shaped to provide the flange element;

and having a mounting unit including a further flange element located axially opposite of said one single integral sheet metal structure and a pipe stub element located inside of and extending coaxially to said bellows element, whereby an end portion of said protection sleeve element is received in said pipe stub element;

in which said further flange element and said pipe stub element are a further single continuous integral sheet metal structure which includes a further first portion forming said pipe stub element and a further second portion which is folded back onto said further first portion forming a further fold area therebetween, which further fold area is shaped to provide said further flange element;

wherein said bellows element has a first and a thereto opposite second end, which first end is welded to the first named single continuous integral sheet metal structure and which second end is welded to the further single continuous integral sheet metal structure, such that the metal expansion joint consists of three formed metal structures which are interconnected by weldings; and in which said first and said second ends of the bellows are of an upturned design and the ends of the second and further second portions of the continuous integral sheet metal structures are also of an upturned design, and in which said folded back second portion is welded onto said first portion at a first spot and the upturned end of the second portion is welded to the first upturned end of the bellows at a second spot, and said further folded back second portion is welded onto said further first portion at a third spot and the second upturned end of the further second portion is welded to the second upturned end of the bellows at a fourth spot.

* * * * *

UNITED STATES PATENT AND TRADEMARK OFFICE
CERTIFICATE OF CORRECTION

PATENT NO.   :   5,480,194
DATED        :   January 2, 1996
INVENTORS    :   MANTOAN ET AL.

It is certified that error appears in the above-identified patent and that said Letters Patent is hereby corrected as shown below:

On the title page,
Item [54], "JOINT VIBRATION" should be --JOINT AND VIBRATION--.

Column 1, line 1, "JOINT VIBRATION" should be --JOINT AND VIBRATION--.

Signed and Sealed this

Sixth Day of August, 1996

Attest:

BRUCE LEHMAN

*Attesting Officer*           *Commissioner of Patents and Trademarks*